United States Patent
Matsuo

(10) Patent No.: US 8,261,088 B2
(45) Date of Patent: Sep. 4, 2012

(54) SECRET AUTHENTICATION SYSTEM

(75) Inventor: Masakatsu Matsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 642 days.

(21) Appl. No.: 12/424,809

(22) Filed: Apr. 16, 2009

(65) Prior Publication Data

US 2009/0271632 A1    Oct. 29, 2009

(30) Foreign Application Priority Data

Apr. 23, 2008    (JP) ................. 2008-112375

(51) Int. Cl.
*H04L 29/06*    (2006.01)

(52) U.S. Cl. ....................................... 713/184

(58) Field of Classification Search ............ 713/189
See application file for complete search history.

(56) References Cited

U.S. PATENT DOCUMENTS

| | | | |
|---|---|---|---|
| 4,759,063 A | 7/1988 | Chaum | |
| 2004/0006713 A1 | 1/2004 | Minemura | |
| 2005/0138397 A1 | 6/2005 | Kusudo et al. | |
| 2005/0138401 A1 | 6/2005 | Terao et al. | |
| 2006/0015746 A1 | 1/2006 | Kusudo et al. | |
| 2006/0080732 A1 | 4/2006 | Ohkubo et al. | |
| 2007/0083757 A1* | 4/2007 | Nakano et al. | 713/168 |
| 2007/0208939 A1 | 9/2007 | Iwamoto et al. | |
| 2007/0261108 A1 | 11/2007 | Lee et al. | |
| 2008/0165955 A1* | 7/2008 | Ibrahim | 380/30 |
| 2008/0178263 A1 | 7/2008 | Tanaka | |
| 2009/0094690 A1 | 4/2009 | Hayashi | |

FOREIGN PATENT DOCUMENTS

| | | |
|---|---|---|
| JP | 2004-317764 A | 11/2004 |
| JP | 2007-293787 A | 11/2007 |
| WO | 2005-031579 AI | 4/2005 |

OTHER PUBLICATIONS

Wu, Tzong-Chen—Remote login authentication scheme based on a geometric approach. Elsevier Science B.V. Computer Communication vol. 18 No. 12. 1995. http://www.sciencedirect.com/science/article/pii/0140366496815957.*
Hwang—Cryptanalysis of a remote login authentication scheme. Elsevier. Computer Communications 22. 1999. http://www.sciencedirect.com/science/article/pii/S0140366499000365.*
Wang—Yet another log-in authentication using N-dimensional construction based on circle property. IEEE. 2003. http://ieeexplore.ieee.org/stamp/stamp.jsp?arnumber=01209522.*
English language Abstract of JP 2007-293787 A, Nov. 8, 2007.
English language Abstract of JP 2004-317764 A, Nov. 11, 2004.
U.S. Appl. No. 12/425,677 to Matsuo, filed Apr. 17, 2009.
U.S. Appl. No. 12/464,436 to Matsuo, filed May 12, 2009.
U.S. Appl. No. 12/427,979 to Matsuo, filed Apr. 22, 2009.

* cited by examiner

*Primary Examiner* — Kaveh Abrishamkar
*Assistant Examiner* — Ngoc D Nguyen
(74) *Attorney, Agent, or Firm* — Greenblum & Bernstein, P.L.C.

(57) ABSTRACT

Authentication data indicating authenticity of a client is distributed into a plurality of function data as distributed data, the plurality of function data including function data specifying a function and rule data specifying the authentication data from the function. The client and a server shares a portion of the plurality of function data. The client calculates verification data from the function data unshared with the server, by performing a calculation process difficult for a third party to calculate the function data, and transmits the verification data to the server. The server verifies authenticity of the client based on the authentication data and distributed data per client stored therein, and the verification data received from the client.

20 Claims, 16 Drawing Sheets

Authenticated apparatus

| Point | X coordinate | Y coordinate |
|---|---|---|
| M | x1 | m |
| S | x2 | s |
| K | x3 | k |

Transmit s,k →

Authenticating apparatus

| Point | X coordinate | Y coordinate |
|---|---|---|
| M | x1 | |
| S | x2 | |
| K | x3 | |

Authenticated apparatus

| Point | X coordinate | Y coordinate |
|---|---|---|
| M1 | x1 | m1 |
| M2 | x2 | m2 |
| K | x3 | s |
| S | x4 | k |

Transmit s,k →

Authenticating apparatus

| Point | X coordinate | Y coordinate |
|---|---|---|
| M1 | x1 | |
| M2 | x2 | m2 |
| K | x3 | |
| S | x4 | |

Fig.9
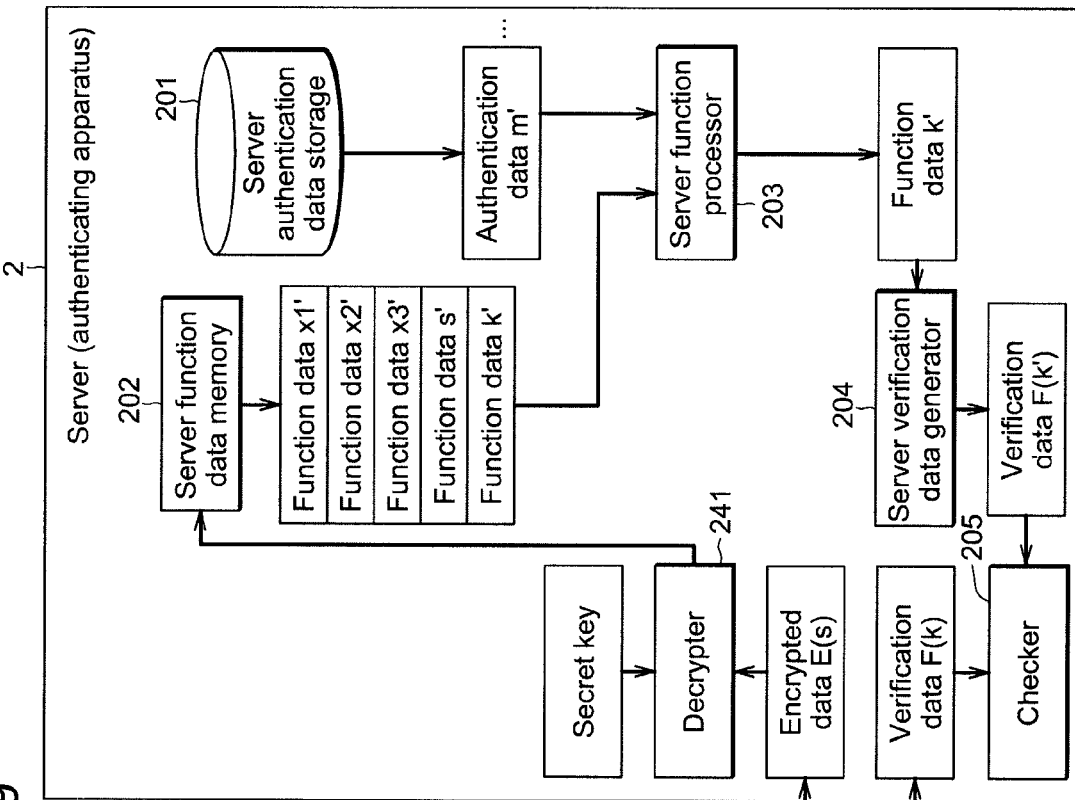
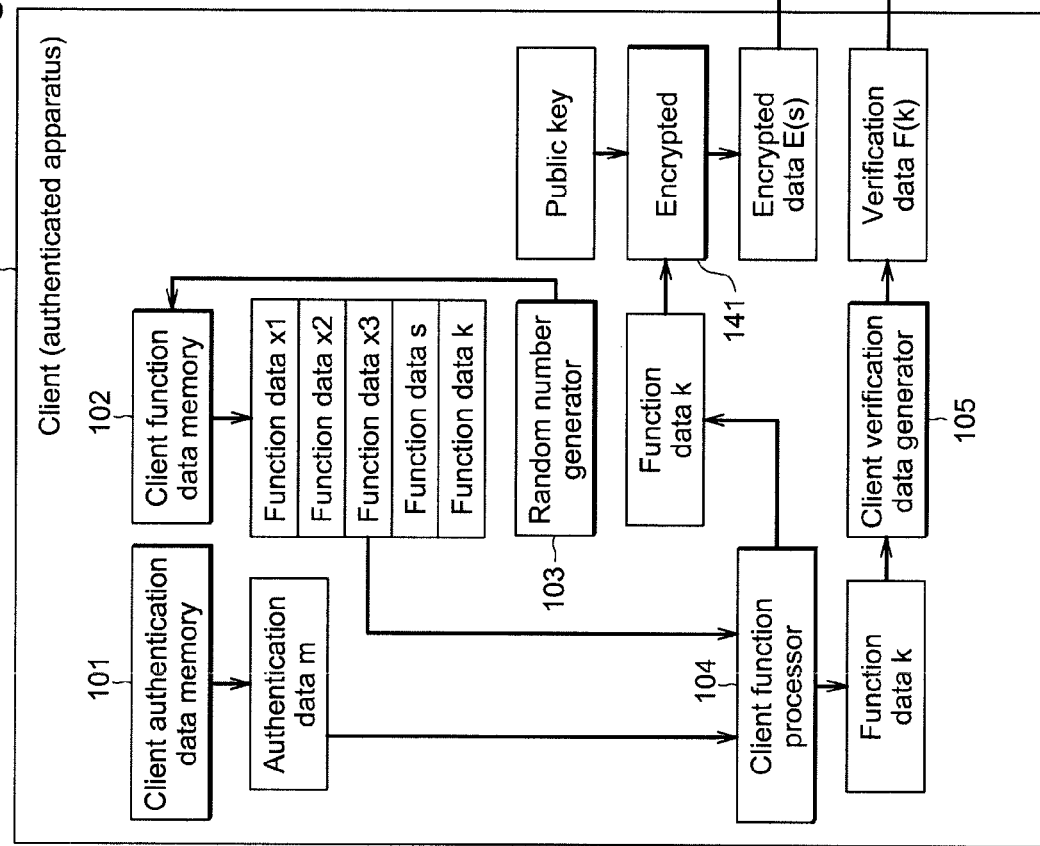

SECRET AUTHENTICATION SYSTEM

CROSS-REFERENCE TO RELATED APPLICATIONS

The present application claims priority under 35 U.S.C. §119 of Japanese Application No. 2008-112375 filed on Apr. 23, 2008, the disclosure of which is expressly incorporated by reference herein in its entirety.

BACKGROUND OF THE INVENTION

1. Field of the Invention

The present invention relates to a secret authentication system in which an authenticated apparatus notifies an authenticating apparatus of authentication data, so that authentication is performed while others are kept from knowing the data.

2. Description of Related Art

Systems providing a variety of services from a server to terminals connected via a network have rapidly been spreading recently, represented as Internet commerce systems, including Internet banking and Internet shopping. In the systems, which require an authentication system that verifies whether or not users are properly registered, authentication data, such as passwords, are transmitted on the network. Due to the nature of the systems, various technologies are known to prevent improper acts of making illicit gains through spoofing by using authentication data stolen from proper users (refer to Related Art 1, for example).

In addition, contactless IC cards functioning as electronic money have quickly been spreading recently. Contactless IC cards and RFID tags are getting used in entry control systems and merchandise control systems. In the systems of this type using RFID devices, it is necessary to prevent improper acts of making illicit gains through spoofing by using skimmed authentication data. Some schemes are known in order to increase security of the RFID devices, including a randomized hash lock scheme, a hash chain scheme (refer to Related Art 2), and a re-encryption scheme (refer to Related Art 3).

[Related Art 1] Japanese Patent Laid-open Publication No. 2007-293787

[Related Art 2] Japanese Patent Re-publication of PCT International Application No. 2005-031579

[Related Art 3] Japanese Patent Laid-open Publication No. 2004-317764

A variety of conventional technologies are able to increase secrecy of authentication data by employing complex calculation processes, but unable to sufficiently satisfy cost reduction demands since the technologies require high-speed computation devices that increase costs. It is thus desired to provide a technology capable of achieving both cost reduction and high secrecy. It is further desired in secret authentication systems to achieve a forward secure scheme, which prevents authentication information (authentication parties, authentication time and date, and the like) from being searched from the past; and a backward secure scheme, which prevents authentication information from being searched in the future.

SUMMARY OF THE INVENTION

The inventor of the present invention has vigorously studied easy implementation of secret authentication using a simple function, such as a simple linear function. The present invention is provided to address the above-described problems in the conventional technologies. A main advantage of the present invention is to provide a secret authentication system configured so as to ensure high secrecy and to reduce computation load to achieve cost reduction. Further, the present invention provides a secret authentication system capable of providing forward secure and backward secure schemes.

The present invention provides a secret authentication system including a client and a server performing authentication of the client. The client includes a client authentication data memory storing one of an x coordinate and a y coordinate of a specific point on any function, as client authentication data indicating the client's authenticity; a function data generator generating client rule data and client function data, the client rule data being a coordinate not defined as the client authentication data on one of the x coordinate and the y coordinate of the specific point on the function, the client function data being x coordinates and y coordinates of a plurality of points excluding the specific point on the function; a random number generator generating any of the client function data using a random number, and transmitting the random number to the server; a client function data memory storing, as client function data, the client distributed function data generated by the function data generator and the random number generated by the random data generator; a client function processor specifying the function by using the client authentication data stored in the client authentication data memory, the client function data stored in the client function data memory, and the random number generated by the random number generator; and a client verification data generator converting, by using a one-way function, one of a portion and all of the client function data output from the client function processor into client verification data, and transmitting the client verification data to the server. The server includes a server authentication data storage obtaining the client authentication data stored in the client authentication data memory, and storing the client authentication data as server authentication data; a server function data generator generating server rule data and server function data, the server rule data being identical to the client rule data generated by the function data generator of the client, the server function data being identical to the client function data generated by the function data generator; a server function data memory storing, as server function data, the random number obtained from the random number generator of the client, and the rule data and the function data generated by the function data generator; a server function processor specifying a function identical to the function specified by the client function processor of the client, by using the server authentication data stored in the server authentication data storage and the server function data stored in the server function data memory; a server verification data generator converting one of a portion and all of the server function data output from the server function processor into server verification data, by using a one-way function identical to the one-way function used by the client verification data generator of the client; and a checker checking the client verification data obtained from the client verification data generator and the server verification data output from the server data generator.

Since all the distributed data are required to obtain the authentication data, the present invention can ensure high secrecy. In addition, using a low order function, such as a linear function, can reduce calculation load, thus allowing use of a low speed calculation device and reducing the cost.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 9 illustrates an overview and a configuration of a fifth embodiment of the present invention;

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A plurality of consideration processes leading to the present invention are explained below step by step, along with issues associated with respective considerations.

Figure 1:
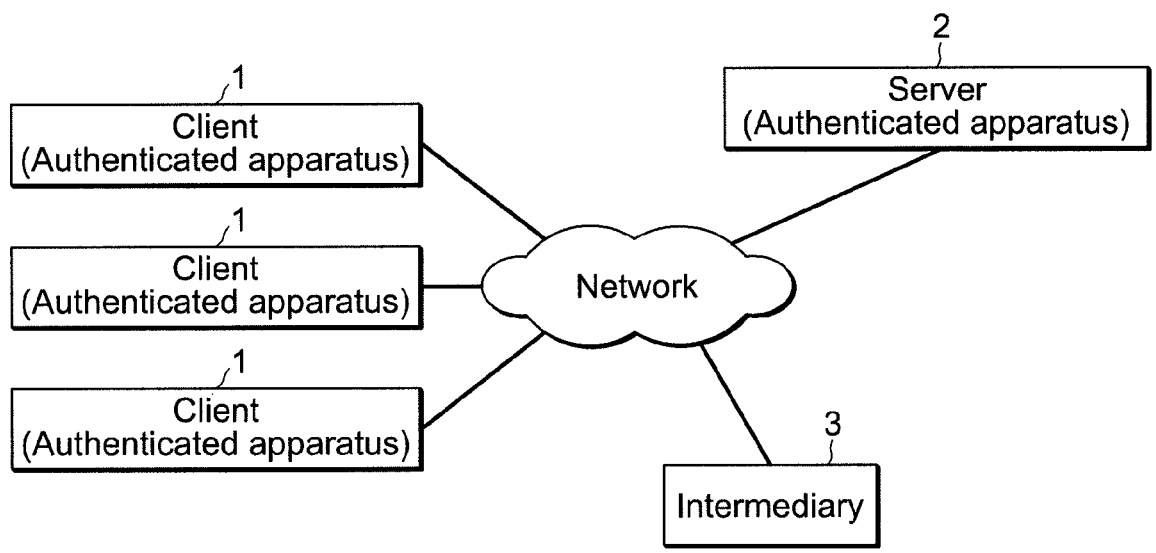
FIG. 1 illustrates a configuration of a secret authentication system.

FIG. 1 illustrates a configuration of a secret authentication system. Client (authenticated apparatus) 1 and server (authenticating apparatus) 2 are connected to each other on a network. Authentication data, including a password and the like, are stored in server 2 in advance. In the configuration, a user of client (authenticated apparatus) 1 provides an administrator of server (authenticating apparatus) 2, with the authentication data that server 2 uses for authenticating client 1, by way of a separate highly confidential method, such as, for example, mail and the like. Thereby, when the user of client 1 notifies server 2 of the authentication data using client 1, server 2 then performs authentication of client 1.

Basic concepts of secret authentication are described with reference to FIGS. 2A to 4. FIGS. 2A to 3B illustrate first to fourth consideration schemes of known secret authentication. In the schemes, a function is used to presume authentication data. A type of assumed function is a linear function having X and Y as variables, more specifically, a function expressed as $Y=aX+b$ (where a and b are coefficients). When "authentication data" m is provided as point M ($x1$, m), where an x coordinate is $x1$ and a y coordinate is m, on a linear function passing through point S ($x2$, s) and point K ($x3$, k) in FIG. 2A, x coordinate values $x2$ and $x3$ and y coordinate values s and k of two points S and K, respectively, and invariables a and b of function $Y=aX+b$ obtained from two points S and K are respectively defined as "function data." Function $Y=aX+b$ is primarily defined by function data $x2$, $x3$, s, and k, and thereby authentication data m, which is the y coordinate of point M, is obtained from point M having "rule data" $x1$ (x coordinate) on the linear function.

Authentication data m is specified by rule data $x1$ herein. Authentication data m are a y coordinate of an intersection point of the linear function and $x=x1$, the linear function being primarily defined by function data $x2$, $x3$, s, and k. Authentication data m may also be specified as a y coordinate of point M' intersecting with another linear function connecting M', S' and K in FIG. 2A. Authentication data m is specified as described above in all examples below as well.

Rule data $x1$ and function data $x2$, $x3$, s, and k are positioned as "distributed data" that distributedly define authentication data m (hereinafter the rule data and function data are collectively referred to as the distributed data). Unless all distributed data $x1$, $x2$, $x3$, s, and k are provided, a and b of liner function $Y=aX+b$ cannot be determined, and thus authentication data m cannot be obtained.

In the first consideration, only authentication data m is shared between client 1 and server 2. In the second consideration, however, a portion of or all of distributed data $x1$ to $x3$, s, and k are shared between client 1 and server 2 before or after authentication in a procedure different from a procedure performed at the time of authentication. When client 1 requests server 2 for authentication, client 1 generates a remainder of the distributed data, which is not shared by client 1 and server 2, and transmits the generated distributed data to server 2. Then, server 2 can obtain the authentication data from the distributed data already shared with client 1 and the remaining distributed data received from client 1 afterwards.

In the first consideration, however, client 1 and server 2 share function data $x2$, $x3$, and k and rule data $x1$, and client 1 transmits to server 2 only function data s, which is the y coordinate of point S; and then server 2 authenticates client 1. Since same function data s is transmitted every time as a password, intermediary 3 can easily masquerade as client 1 and intercept function data s on a communication channel.

Figure 2A:
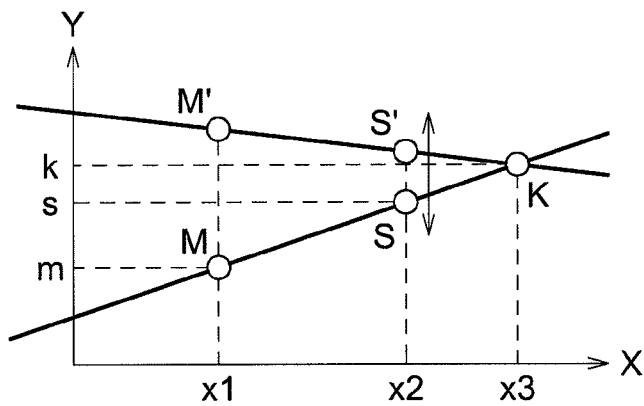
FIG. 2A illustrates a first consideration scheme of secret authentication.
Figure 2B:
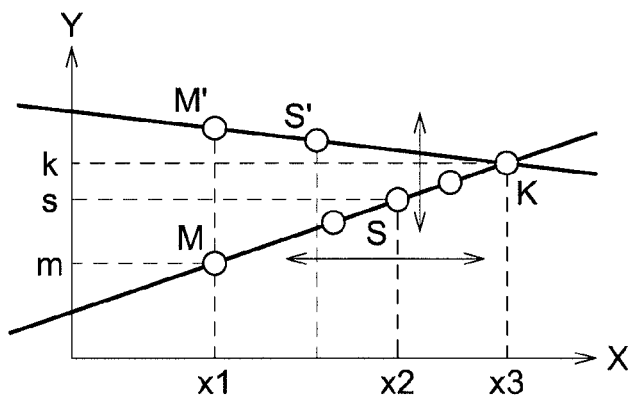
FIG. 2B illustrates a second consideration scheme of secret authentication.

The second consideration as an improvement of the first consideration is explained with reference to FIG. 2B. Client 1 transmits to server 2 function data $x2$ and s, which are the x coordinate and the y coordinate of one point S. Client 1 and server 2 share remaining function data $x3$ and k and rule data $x1$. Remaining rule data $x1$ and function data $x3$ and k are fixed values, and at least a portion of the data is kept secret. In this case, function data $x2$, which is the x coordinate of point S, can be any value. Thus, point S on the linear function could fall on a variety of points, as shown in FIG. 2B, depending on random number scrambling. In other words, the y coordinate of point S (function data s) also changes according to the change of x coordinate $x2$ on liner function $Y=aX+b$. Even in the second consideration, however, point S ($x2$, s) is aligned on the same linear function for same client 1, when authentication is performed for a plurality of times. Thus, even when s is a random number, a problem cannot be solved where spoofing is possible once intermediary 3 determines function data s and x2 on the linear function.

Figure 3A:
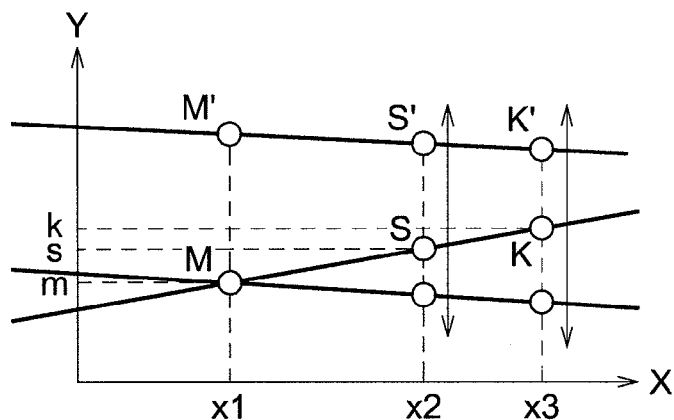
FIG. 3A illustrates a third consideration scheme of secret authentication.

An overview of the third consideration is explained below with reference to FIG. 3A. In the third consideration shown in FIG. 3A, client 1 transmits to server 2, y coordinates s and k of two points S and K, respectively, on liner function Y=aX+b. Client 1 and server 2 share remaining rule data x1 and function data x2 and x3. Rule data x1 and function data x2 and x3 are fixed values, and at least a portion of the data is kept secret. In this case, function data s is any value, such as generated from a random number, for example; and function data k is determined as the y coordinate of point K, where the x coordinate is x3 on a linear function passing through two points M and S. In the third consideration scheme, function data s, which is the y coordinate of point S, constantly changes as a random number, and thus a gradient of the linear function passing through two points S and K changes at each authentication. When authentication is performed for a plurality of times, however, point M (x1, m), which specifies authentication data m, appears as an intersection point of the linear function passing through two points S and K. Thus, authentication data m may be detected by intermediary 3.

Figure 3B:
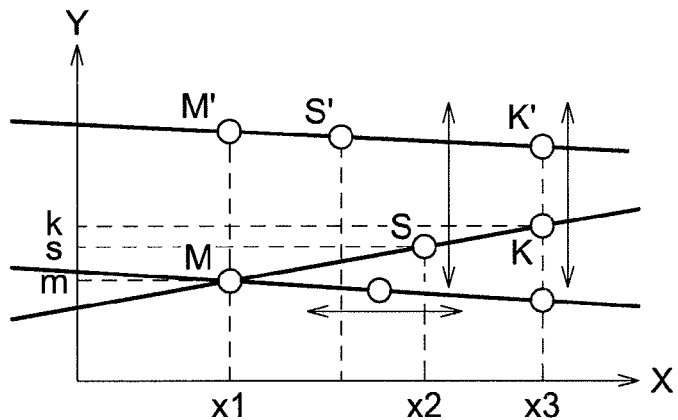
FIG. 3B illustrates a fourth consideration scheme of secret authentication.

An overview of the fourth consideration is explained below with reference to FIG. 3B. The fourth consideration is different from the third consideration in that, while only function data s is generated from a random number in the third consideration, a plurality of function data are generated from random numbers in the fourth consideration. Function data s, x2, and k, which are the x coordinate and the y coordinate of point S and the y coordinate of point K, respectively, are transmitted. Remaining rule data x1 and function data x3 are shared between client 1 and server 2. Rule data x1 and function data x3 are fixed values, and at least a portion of the data is kept secret. In this case, function data s and x2 are any values, such as generated from random numbers, for example; and function data k is determined as the y coordinate of point K, where the x coordinate is x3 on the linear function passing through two points M and S. In the fourth consideration scheme, both the x coordinate and the y coordinate of point S (x2, s) on the linear function are random numbers, and thus point S may fall on a variety of points on the linear function, and a gradient of the linear function passing through points S and K changes at each authentication. When authentication is performed for a plurality of times, however, point M (x1, m), which specifies authentication data m, eventually appears as an intersection point of the linear function passing through points S and K. Thus, authentication data m may be detected.

Figure 4:
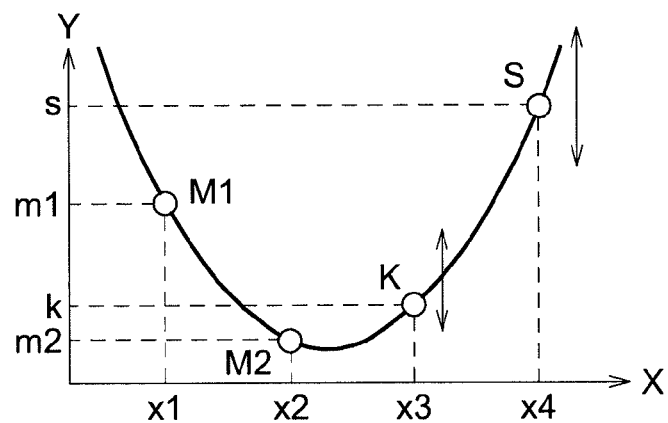
FIG. 4 illustrates a fifth consideration scheme of secret authentication.

Lastly, a fifth consideration scheme of secret authentication is explained with reference to FIG. 4. A type of function assumed in the fifth consideration is a quadratic function having X and Y as variables, the function being expressed as $Y=cX^2+dX+e$ (where c, d, and e are coefficients). When quadratic function $Y=cX^2+dX+e$ is defined as a quadratic function passing through at least three points of M2 (x2, m2), K (x3, k), and S (x4, s), authentication data m is provided as the y coordinate of point M1 (x1, m1), where the x coordinate is x1.

The fifth consideration is different from the first to fourth considerations in that, while simple secret authentication is attempted using the linear function in the first to fourth considerations, a polynomial function of degree two or higher, such as, for example, a quadratic function and a cubic function, is employed in the fifth consideration. When y coordinate m of point M on the quadratic function is distributed into and transmitted as five data, which include the x coordinate and the y coordinate of other points on the mathematically same function (for instance, point K (x2, k) and point S (x3, s)) and x coordinate x1 of point M, authentication data m1 cannot be obtained unless all the distributed data (a collective term referring to the rule data and function data) x1 to x4, m2, s, and k are provided.

A portion of distributed data x1 to x4, m2, s, and k is shared between client 1 and server 2 before or after authentication in a procedure different from a procedure performed at the time of authentication. When client 1 requests server 2 for authentication, client 1 generates distributed data unshared with server 2, and transmits the generated distributed data to server 2. Then, server 2 can obtain the authentication data from the distributed data stored therein and the distributed data received from client 1.

Similar to the examples where the linear function is used in the first to fourth considerations, a variety of combinations are considered for settings of the distributed data shared between client 1 and server 2, and of the distributed data to be transmitted from client 1 to server at the time of authentication. Still, a possibility of spoofing or stealing of authentication data by intermediary 3 cannot be eliminated.

In the prevent invention, neither a portion nor all of distributed data are transmitted as they are from client 1 to server 2, as explained below. A main concept of the present invention is that client 1 generates "verification data," which is distributed data further processed with a calculation difficult for intermediary 3 to perform a back calculation; that server 2 also generates verification data from the distributed data in a similar procedure; and that server 2 cross-checks the two verification data, and then authenticates client 1. More specifically, when a portion of the distributed data to be transmitted is processed with a calculation difficult for intermediary 3 to perform a back calculation, it is difficult for the intermediary to perform a back calculation of authentication data, even when the distributed data and the verification data, which is partially processed distributed data, are intercepted as being transmitted from authenticated apparatus 1 to authenticating apparatus 2 during communication between the two apparatuses. Since the contents of the distributed data, which is a source of the verification data, are unknown to intermediary 3, and thus not all distributed data are provided, it is difficult for intermediary 3 to presume authentication data. Thereby, improper authentication can surely be prevented, and thus high secrecy can be ensured. Further, using a low order function, such as a linear function, reduces calculation load. Thus, a low speed calculation device will suffice, and the cost will reduce.

First Embodiment

In the above-explained first to fifth considerations, the distributed data are transmitted from client 1 to server 2 as they are for authentication. A first embodiment of the present invention is similar in that a simple function, such as a linear function, a quadratic function, or the like, is used for authentication. The first embodiment is different, however, in that rule data x1 specifying authentication data m, a plurality of function data (for example, x2, x3, and k), and distributed data s specified with a random number are generated; that server 2 shares the same distributed data (x1', x2', x3', s', and k') with client 1; that client 1 calculates "verification data" F (k) in a method difficult for intermediary 3 to perform a back calculation of function data k; that server 2 separately calculates "verification data" F (k)' in a similar procedure; that client 1 transmits calculated verification data F (k) to server 2;

and that server 2 checks verification data F (k) received from client 1 against self-calculated verification data F (k)', and then authenticates client 1.

Figure 5:
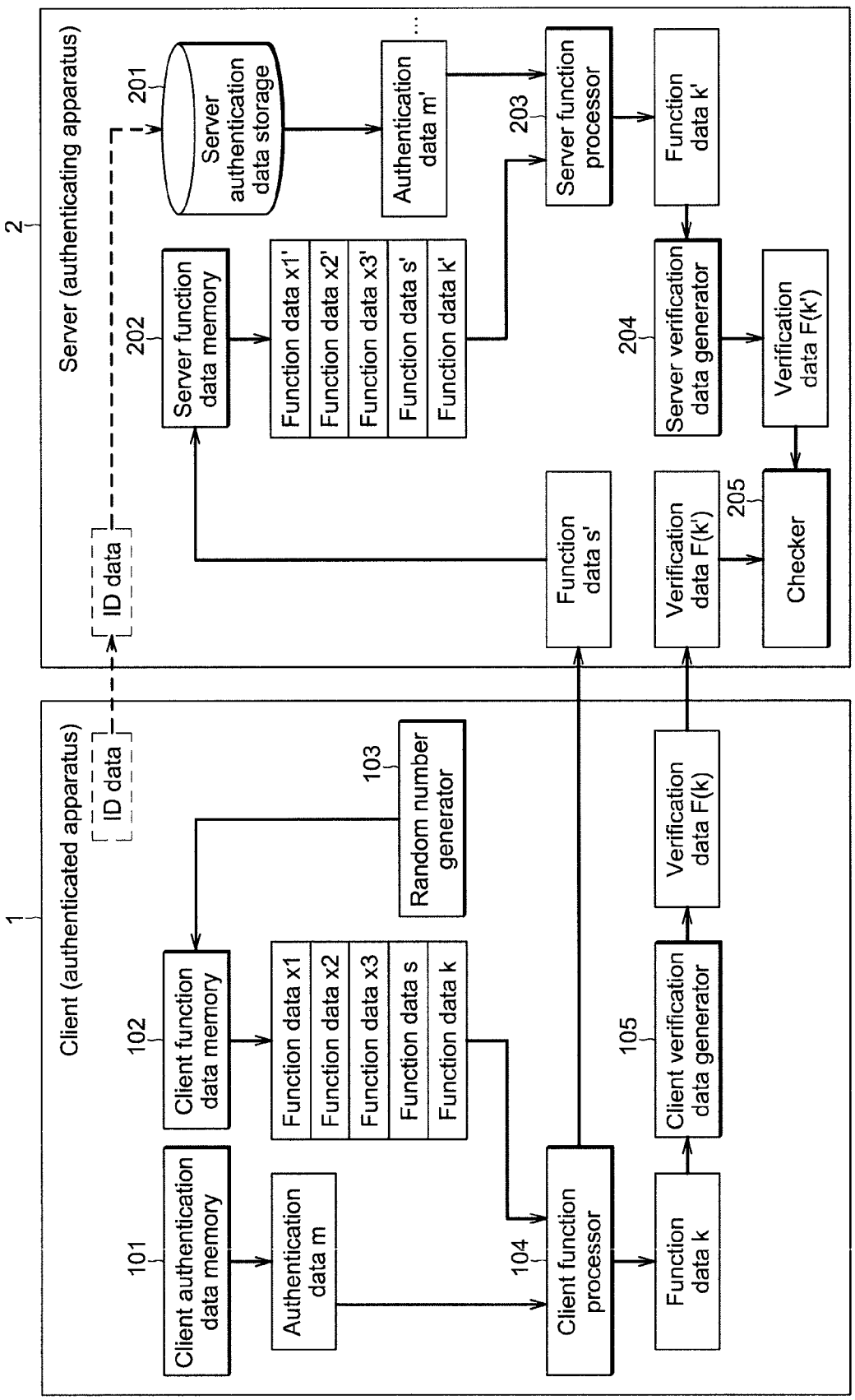
FIG. 5 illustrates an overview and a configuration of a first embodiment of the present invention.

A concept and a configuration example of the first embodiment of the present invention are explained below with reference to FIGS. 3A and 5. In the first embodiment, a case is explained where a linear function having X and Y as variables and expressed as Y=aX+b (where a and b are coefficients) is used as a function for authentication between client 1 and server 2 in FIG. 3A. In FIG. 5, identical authentication data m and m' (m=m') are shared in advance by client authentication data memory 101 of client 1 and server authentication data storage 201 of server 2. For instance, client authenticating apparatus setter 10 of client 1 sets desired authentication data m; or a client user sets desired authentication data m as the client wishes. Then, authentication data m is stored or registered in client authentication data memory 101. Authentication data m stored in client authentication data memory 101 is delivered from a user of client 1 to an administrator of server 2, as shown in FIG. 1 or 5, in a highly confidential method, such as, for example, mail and the like. Then, authentication data m is also stored or registered in server authentication data storage 201 of server 2 in advance as identical authentication data m'. Function data generator 100 defines or sets any two points defining linear function Y=aX+b, such as, for example, point S (x2, s; where s is a random number generated by random number generator 103 hereinafter described) and point K (x3, k). Four data, which include three "function data" x2, x3, and k, and x coordinate x1 as the "rule data" when authentication data m is defined as the y coordinate of linear function Y=aX+b, are collectively stored in client distributed data memory 102 as four distributed data (x1, x2, x3, and k). Function data s is generated from a random number by random number generator 103. Random number generator 103 stores generated random number s in client data memory 102. Further, random number s generated by random number 103 is transmitted to server 2, as described hereinafter. Function data generator 100 defines or sets for server 2 as well, distributed data (x1', x2', x3', and k') identical to the distributed data (x1, x2, x3, and k) stored in client distributed data memory 102. Distributed data memory 202 of server 2 receives the distributed data (x1', x2', x3', and k') from function data generator 100, and then stores or registers the received data. As described above, server 2 receives random number s, which is generated by random number generator 103 of client 1 and transmitted, and stores the random number in server distributed data memory 202 as random number s' (s=s'). Namely, distributed data memory 202 of server 2 stores or registers the distributed data (x1', x2', x3', s', and k'). As described above, authentication data m' is stored in advance in server authentication data storage 201 of server 2, authentication data m' being identical to authentication data m registered in client authentication data memory 101. In other words, client 1 and server 2 have in common identical authentication data m and m' in client authentication data memory 101 and server authentication data storage 201, respectively; and the distributed data (x1, x2, x3, s, and k) and the distributed data (x1', x2', x3', s', and k') in client distributed data memory 102 and server function data memory 202, respectively. Client function processor 104 of client 1 defines two points S (x2, s) and K (x3, k) from the distributed data (x1, x2, x3, s, and k) stored in client distributed data memory 102. Client function processor 104 calculates coefficients a and b of linear function Y=aX+b from the two points, and determines the linear function. The most important aspect in the first embodiment lies in that, in addition to that function data s generated from a random number is transmitted to and checked on server 2, function data k is output from client function processor 104; that function data k is converted into verification data F (k) by client verification data generator 105 in calculation process F which is difficult for intermediary 3 to perform a back calculation; and that verification data F (k) is then output and transmitted to server 2. A typical one-way function, such as a hash function and the like, can be used as a one-way function employed in client verification data generator 105 for the calculation process difficult for intermediary 3 to perform a back calculation. In light of one-wayness sufficient for practical use, however, a square function is suitable with low calculation load, which allows application to simple devices having merely a low speed calculation function (an RFID tag and the like).

Subsequently, server 2 defines two points S (x2', s') and K (x3', k') from authentication data m' registered in server authentication data storage 201 and the function data (x1', x2', x3', s', and k') registered in server function data memory 202. Then, server 2 calculates from the two points coefficients a and b of linear function Y=aX+b, and determines the linear function. The linear function is identical to the linear function calculated in function processor 104 of client 1 as described above. Server function processor 203 then outputs function data k'. Server verification data generator 204 converts function data k' into verification data F (k)' by performing calculation process F identical to the calculation process performed on client 1 and difficult for intermediary 3 to perform a back calculation. Server checker 205, which has already received verification data F (k) from verification data generator 105 of client 1 as described above, checks the already received data against verification data F (k)' output from server verification data generator 204, and then completes authentication of client 1 depending on the check result.

More specifically, server 2 sequentially reads out authentication data m' from server authentication data storage 201. When checker 205 finds in authentication data storage 201 of server 2, authentication data m' having verification data F (k)', which is calculated by server verification data generator 204, identical to verification data F (k) received from client 1, authentication is deemed to succeed. When the data are not identical, server 2 reads out subsequent authentication data m' from authentication data storage 201 and performs the process described above. When no authentication data m' having identical data is found in server authentication data storage 201, authentication is deemed to fail.

In the configuration above, even in a hypothetical case where intermediary 3 knows distributed data x1 to x3 and intercepts function data s and verification data F (k) transmitted from client 1 to server 2, more specifically, intermediary 3 knows all the distributed data, except k, and verification data F (k), intermediary 3 is unable to calculate function data k backwards from verification data F (k), which was obtained from function data k in calculation process F difficult to perform a back calculation, and thus is unable to specify point K (x3, k). Since intermediary 3 is then unable to specify the linear function, intermediary 3 is unable to obtain authentication data m, even when succeeding in intercepting point S (x2, s) and rule data x1 alone. In addition, function data s of the first embodiment is a random number generated by random number generator 103 and changes at every authentication request from client 1 to server 2. Thus, when client 1 and server 2 use for authentication common linear function Y=aX+b shown in FIG. 3A, for example, point S shifts toward the Y axis with respect to point M as a fixed point, along with the change of y coordinate s of point S at every authentication request from client 1. Thus, coefficients a and b of function Y=aX+b change, and a gradient and an intercept change. Accordingly, point K, which has function data k as the y coordinate, also shifts toward the Y axis, and thus function data k on client 1 in FIG. 5 changes at every authentication request from client 1. Thereby, verification data F (k) also changes at every authentication request from client 1, thus making it further difficult to specify function data k for a third party intervening in communication between client 1 and server 2.

ID data identifying authentication data m of client 1 may be transmitted from client 1 to server 2, along with verification data F (k) and random number data s. Server 2 then reads out from server authentication data storage 201, authentication data m' corresponding to the ID data received from client 1. Thus, a comparison process at checker 205 is performed only once, and the process is simplified.

Second Embodiment

Figure 6:
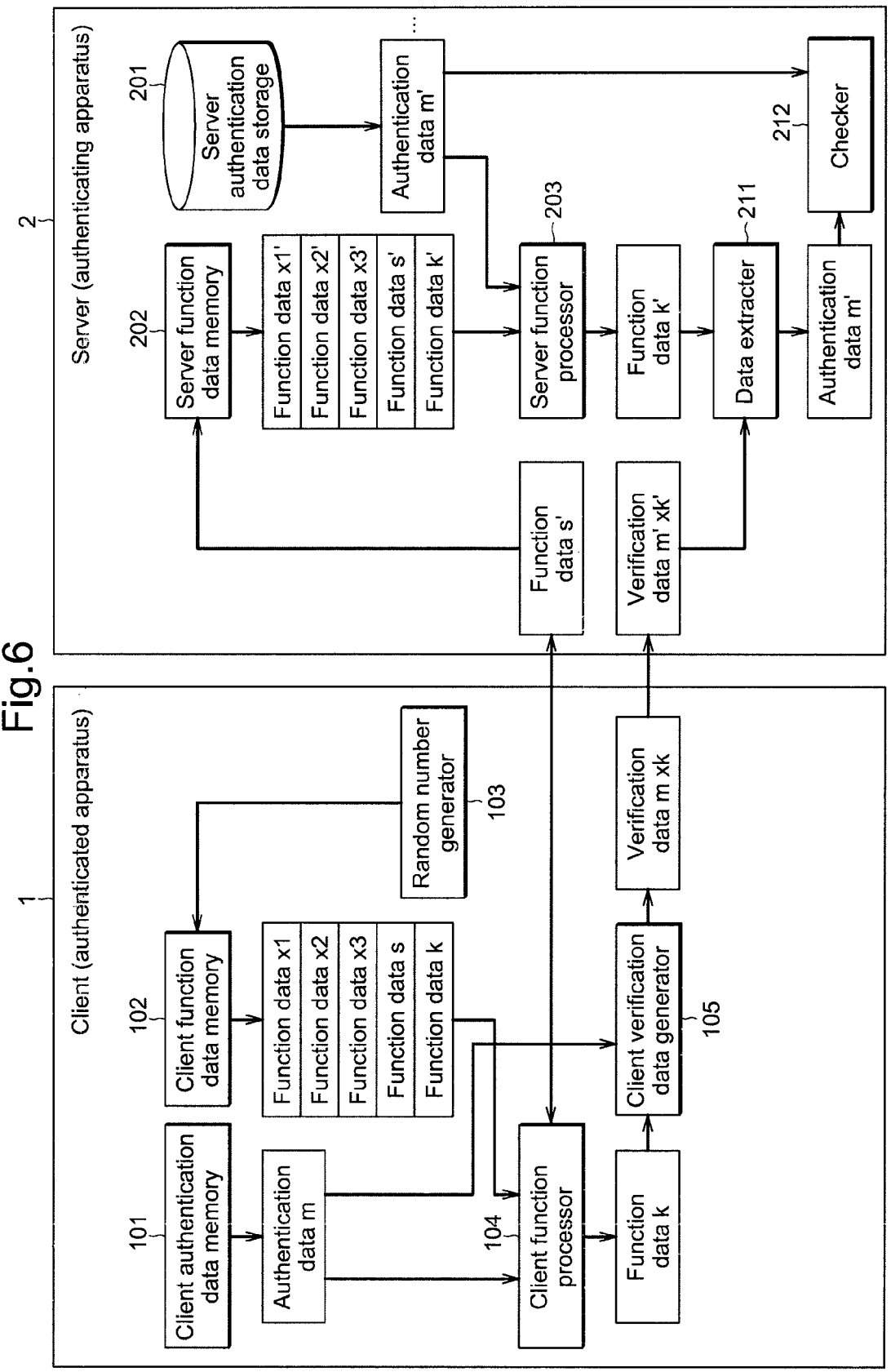
FIG. 6 illustrates an overview and a configuration of a second embodiment of the present invention.

FIG. 6 is a block diagram illustrating a second embodiment of client 1 and client 2 shown in FIG. 1. In FIG. 5, client verification data generator 105 of client 1 and server verification data generator 204 of server 2 perform calculation processes difficult for a third party to perform a back calculation, by using a one-way function, such as a hash function, a square function, and the like. In contrast, client 1 in FIG. 6 has client verification data generator 111, which provides verification data m×k by multiplying function data k by authentication data m, function data k being calculated in client function processor 104. Then, verification data m×k and function data s are transmitted from client 1 to server 2. Server 2 has data extracter 211 and checker 212. Data extracter 211 performs for verification data m'×k' received from client 1, a calculation process in a backward direction of the calculation process performed in client verification data generator 111 of client 1. Specifically, data extracter 211 multiplies verification data m'×k' by an inverse of function data k' calculated by server function processor 203, and thus obtains authentication data m'. Checker 212 compares authentication data m' obtained from data extracter 211 and authentication data m retrieved from server authentication data storage 201, and thus verifies authenticity of client 1. Authentication data m is not normally provided over the network. Thus, a third party intervening in communication between client 1 and server 2, such as, for example, intermediary 3 in FIG. 1, is unable to know authentication data m in FIG. 6, and thus is unable to obtain function data k serving as a source of verification data m×k. Further, function data s of the second embodiment is a random number generated by random number generator 103 and changes at every authentication request from client 1. Thus, when client 1 and server 2 use common linear function Y=aX+b shown in FIG. 3A, for example, point S shifts toward the Y axis with respect to point M as a fixed point, along with the change of y coordinate s of point S at every authentication request from client 1. Thus, coefficients a and b of function Y=aX+b change, and a gradient and an intercept change. Accordingly, point K, which has function data k as the y coordinate, also shifts toward the Y axis, and thus function data k in FIG. 6 changes at every authentication request from client 1. Thereby, verification data m×k also changes at every authentication request from client 1, thus making it further difficult to specify function data k and authentication data m for a third party intervening in communication between client 1 and server 2. Thus, the method above is applicable as a calculation process difficult for a third party to perform a back calculation. Other components in the configuration are the same as those in the example in FIG. 5.

Similar to client 1, server 2 may obtain verification data m'×k' by multiplying function data k' by authentication data m', function data k' being calculated by server function processor 203. Then, server may verify authenticity of client 1 by comparing obtained verification data m'×k' and verification data m×k received from client 1.

Third Embodiment

Figure 7:
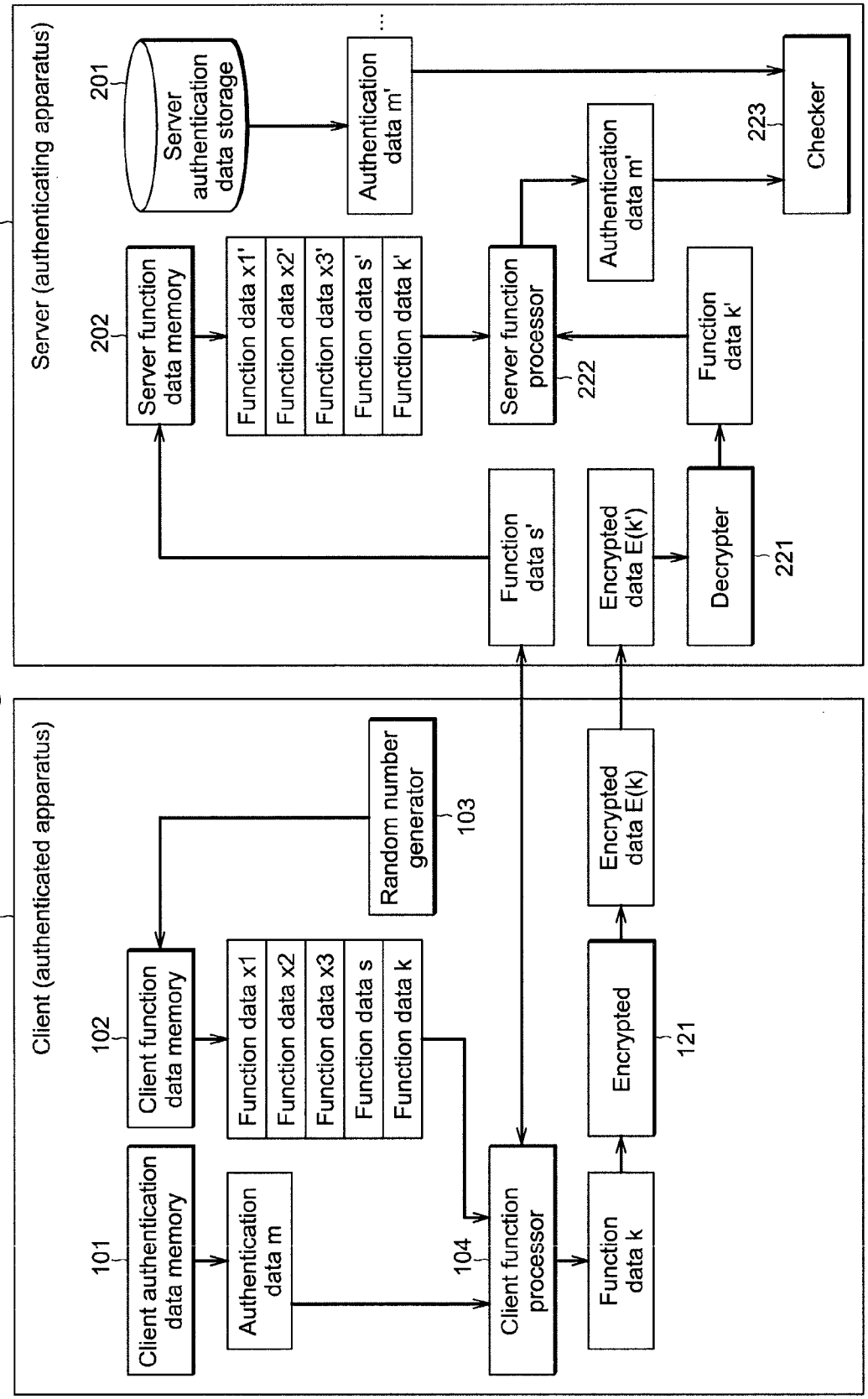
FIG. 7 illustrates an overview and a configuration of a third embodiment of the present invention.

FIG. 7 is a block diagram illustrating a third embodiment of the client and server shown in FIG. 1. In FIG. 5, client verification data generator 105 of client 1 and server verification data generator 204 of server 2 perform calculation processes difficult for a third party to perform a back calculation, by using a one-way function, such as a hash function, a square function, and the like. In contrast, client 1 in FIG. 7 has encrypter 121, which encrypts function data k calculated by client function processor 104, by using a public key of server 2. Encrypted distributed data E (k) and function data s are transmitted to server 2. Server 2 has decrypter 221, server function processor 222, and checker 223. Decrypter 221 decrypts encrypted distributed data E (k)' received from client 1, by using its own private key. Server function processor 222 obtains authentication data m' from function data k' obtained from decrypter 221, function data x1' to x3' stored in server function data memory 202, and function data s' received from client 1. Checker 223 compares authentication data m' obtained from server function processor 222 and authentication data m retrieved from server authentication data storage 201, and thus verifies authenticity of client 1. The private key used in decrypter 221 of server 2 is not normally provided over the network. Since a third party intervening in communication between client 1 and server 2, such as, for example, intermediary 3 in FIG. 1, does not have the private key used in decrypter 221, the third party is unable to obtain function data k' serving as a source of verification data E (k)'. Even when the third party obtains the public key used in encrypter 121 in FIG. 7, the third party is unable to obtain function data k' from verification data E (k)' by using the public key alone. The method above appears to be equivalent to encryption of a password for authentication. A password encryption method has a problem, however, since a value is constantly the same while the password remains the same. Function data s of the third embodiment is a random number generated by random number generator 103 and changes at every authentication request from client 1. Thus, when client 1 and server 2 use common linear function Y=aX+b shown in FIG. 3A, for example, point S shifts toward the Y axis with respect to point M as a fixed point, along with the change of y coordinate s of point S at every authentication request from client 1. Thus, coefficients a and b of function Y=aX+b change, and a gradient and an intercept change. Accordingly, point K, which has function data k as the y coordinate, also shifts toward the Y axis, and thus function data k in FIG. 7 changes at every authentication request from client 1. Thereby, verification data E (k) also changes at every authentication request from client 1, thus making it further difficult to specify function data k and the private key for a third party intervening in communication between client 1 and server 2. Thus, the method above is applicable as a calculation process difficult for a third party to perform a back calculation. Other components in the configuration are the same as those in the example in FIG. 5.

When a value of function data k is very large, hybrid encryption is recommended in which a common key is generated from random numbers; function data k is encrypted with the common key; and the common key is encrypted with the public key of server 2. Although the public key of server 2 is used as an encryption key herein, the common key may be used which is shared between client 1 and server 2.

Fourth Embodiment

Figure 8:
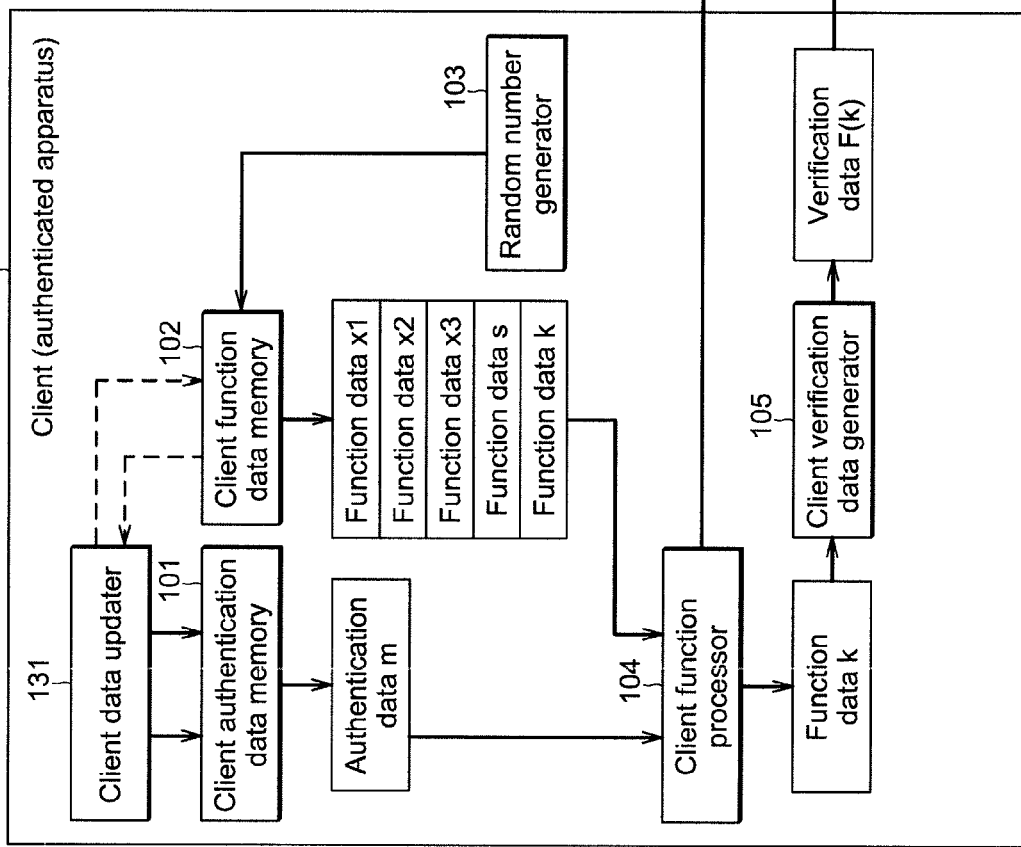
FIG. 8 illustrates an overview and a configuration of a fourth embodiment of the present invention.

FIG. 8 is a block diagram illustrating a fourth embodiment of the client and server shown in FIG. 1. In addition to the configuration explained in the example of FIG. 5, client 1 herein has client data updater 131, which converts authentication data m stored in client authentication data memory 101, by using a one-way function, and updates authentication data m based on the conversion result. Solid line arrows between client authentication data memory 101 and client data updater 131 indicate exchanges of authentication data m before and after the update. Further, server 2 has server data updater 231, which converts authentication data m' stored in server authentication data storage 201, by using a one-way function identical to the one-way function of client data updater 131, and updates authentication data m' based on the conversion result. Solid line arrows between server authentication data storage 201 and server data updater 231 indicate exchanges of authentication data m' before and after the update. Other components in the configuration are the same as those in the example in FIG. 5.

Client data updater 131 of client 1 and server data updater 231 of server 2 use the one-way function identical to each other. A typical one-way function, such as a hash function and the like, is applicable as the one-way function. In light of one-wayness sufficient for practical use, however, a square function is suitable with low calculation load, which allows application to simple devices having merely a low speed calculation function (an RFID tag and the like).

The update process is performed at a same timing in client data updater 131 of client 1 and server data updater 231 of server 2. At each authentication, the authentication data is updated in client data updater 131 of client 1, and concurrently the authentication data associated with client 1 is updated in server data updater 231 of server 2.

Thereby, even when a third party steals authentication data m that client 1 and server 2 have and has a past communication history of all clients having communicated with server 2, authentication data m that client 1 and server 2 had in the past are not known. Thus, a forward secure scheme is provided to prevent authentication information (authentication parties, authentication time and date, and the like) from being searched from the past. In addition, the conversion process is simply performed in each apparatus, thus reducing the cost. In a case of card authentication and the like where the client is a card, the configuration above is preferable since security is ensured even with no special measure taken at the time of disposal of the card.

Client data updater 131 and server data updater 231 may update, by using a one-way function, distributed data x1 to x3 stored in client distributed data memory 102 and distributed data x1' to x3' stored in server distributed data memory 202, respectively, particularly rule data x1 and rule data x1', respectively, required for specifying authentication data m. Exchanges of distributed data x1 to x3 and distributed data x1' to x3' before and after the update are indicated with broken line arrows between client function data memory 102 and client data updater 131 of client 1 and broken line arrows between server function data memory 202 and server data updater 231 of server 2.

Fifth Embodiment

FIG. 9 is a block diagram illustrating a fifth embodiment of the client and server shown in FIG. 1. In addition to the configuration explained in the example of FIG. 5, client 1 herein has encrypter 141, which encrypts function data s generated by random number generator 103, by using a public key of server 2. Encrypted data E (s) obtained therein is transmitted to server 2. Server 2 has decrypter 241, which decrypts encrypted data E (s)' received from client 1, by using its own private key. Function data s' obtained therein is transferred to server function processor 203. Other components in the configuration are the same as those in the example in FIG. 5.

Thereby, even when a third party steals authentication data m that client 1 and server 2 have, intermediary 3 intervening in communication between client 1 and server 2 does not know contents of function data transmitted from client 1 to server 2 without the private key of server 2, since the transmitted function data is encrypted. Thus, a backward secure scheme is provided to prevent authentication information from being searched in the future. Further, a forward secure scheme is provided to prevent authentication information from being searched from the past. In a case of card authentication and the like where the client is a card, the configuration above at least prevents a card holder's actions from being monitored even when data on the card are stolen while the card holder is unaware.

Of verification data F (k) and function data s transmitted from client 1 to server 2, only function data s is encrypted herein. Both data may be encrypted, and alternatively only verification data F (k) may be encrypted.

When a value of function data s or k is very large, hybrid encryption is recommended in which a common key is generated from random numbers; function data s or k is encrypted with the common key; and the common key is encrypted with the public key of server 2.

Sixth Embodiment

Figure 10:
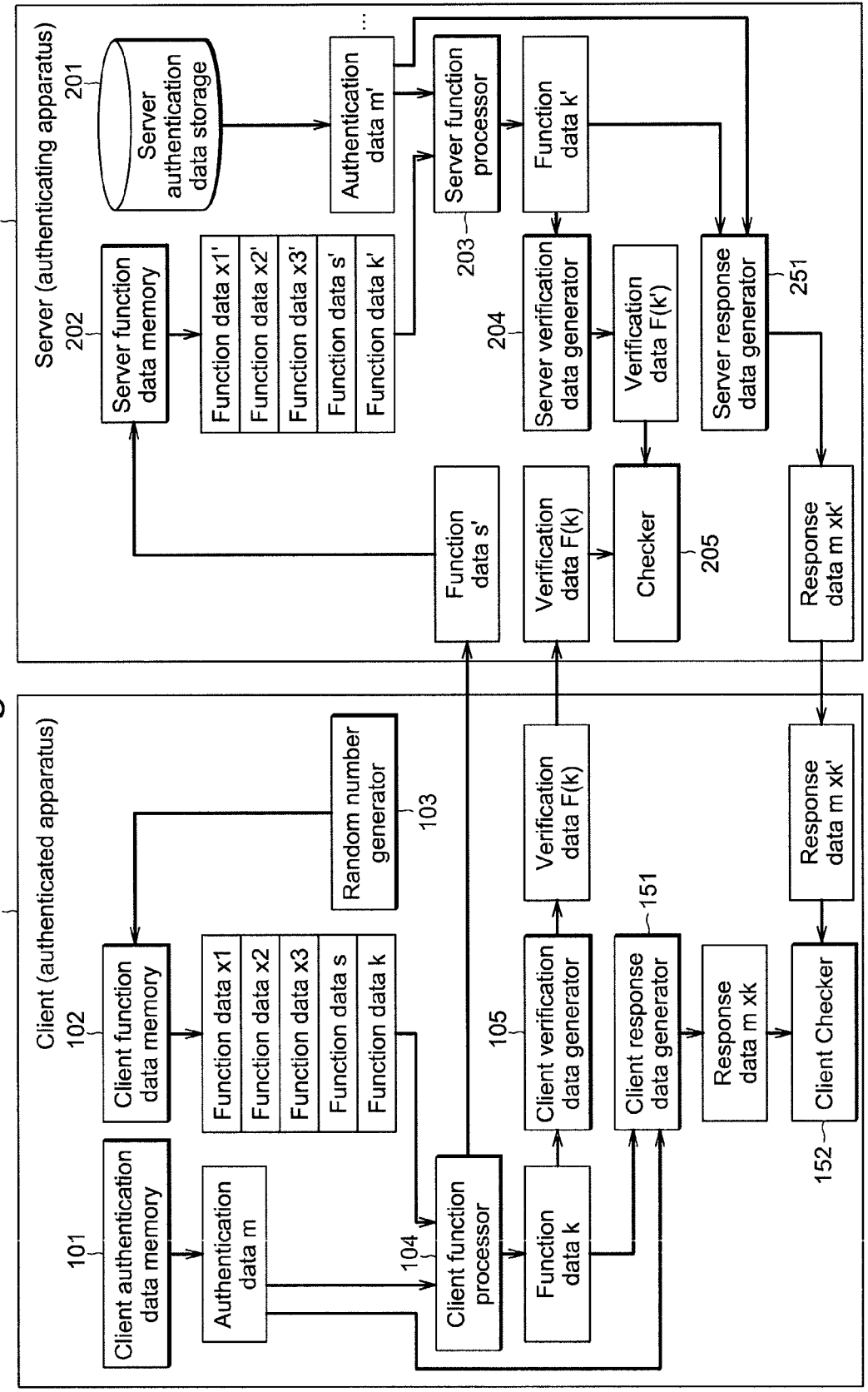
FIG. 10 illustrates an overview and a configuration of a sixth embodiment of the present invention.

FIG. 10 is a block diagram illustrating a sixth embodiment of the client and server shown in FIG. 1. In addition to the configuration explained in the example of FIG. 5, server 2 herein has server response data generator 251, which obtains response data m'×k' by multiplying function data k' by authentication data m', function data k' being calculated in server function processor 203. Response data m'×k' are transmitted to client 1. Client 1 has client response data generator 151 and client checker 152. Client response data generator 151 multiplies function data k calculated in client function processor 104 by authentication data m, and thus obtains response data m×k. Client checker 152 compares response data m×k calculated in client response data generator 151 with response data m'×k' received from server 2, and thus verifies authenticity of server 2. Other components in the configuration are the same as those in the example in FIG. 5.

Thereby, the configuration allows client 1 to confirm authenticity of server 2, thus achieving interactive authentication.

The response data may be obtained in a calculation process in which function data k is converted with a one-way function, similar to the verification data shown in the example of FIG. 5. Alternatively, the response data may be encrypted function data k, similar to the verification data shown in the example of FIG. 7. In any case, the response data should be obtained in a process different from a process for obtaining the verification data.

Seventh Embodiment

Figure 11:
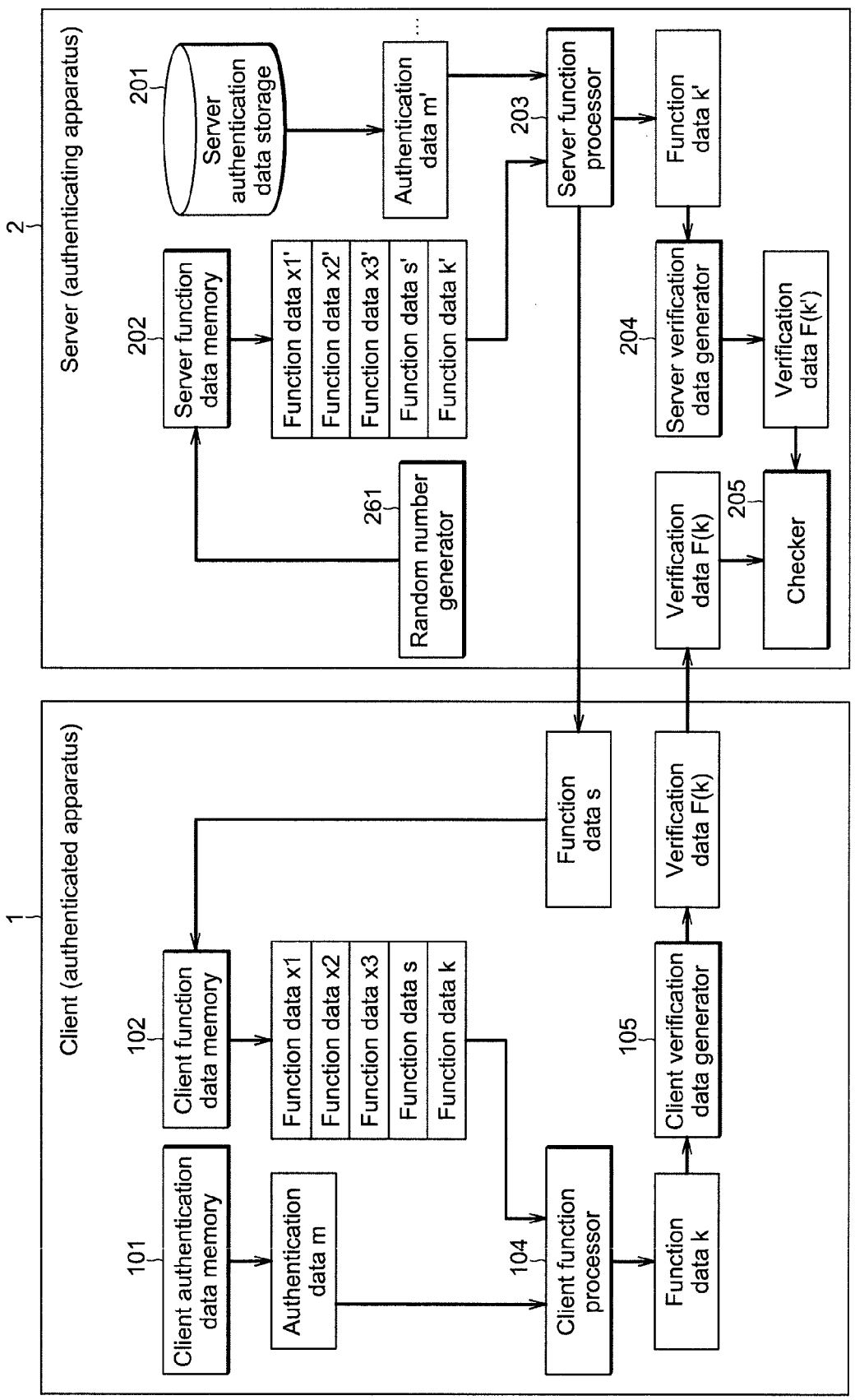
FIG. 11 illustrates an overview and a configuration of a seventh embodiment of the present invention.

FIG. 11 is a block diagram illustrating a seventh embodiment of the client and server shown in FIG. 1. In FIG. 5, client 1 has client random number generator 103, which generates function data s using a random number, and transmits obtained function data s to server 2. In contrast, server 2 in FIG. 11 has random number generator 261, which generates function data s' using a random number, and transmits obtained function data s' to client 1. Client function processor 104 of client 1 calculates function data k from function data s received from server 2, authentication data m stored in client authentication data memory 101, and function data x1 to x3 stored in client function data memory 102. Obtained function data k is transmitted to server 2. Other components in the configuration are the same as those in the example in FIG. 5.

In the configuration above, function data s transmitted from server 2 to client 1 changes irregularly. Thus, even when a third party intervening in communication between client 1 and server 2 uses the function data used therein by copying communication between client 1 and server 2, it is highly unlikely that server 2 outputs again function data s matching the function data from client 1, which the third party attempts to copy and use. Thus, authentication cannot be granted improperly, and retry attacks can be prevented.

Eighth Embodiment

Figure 12:
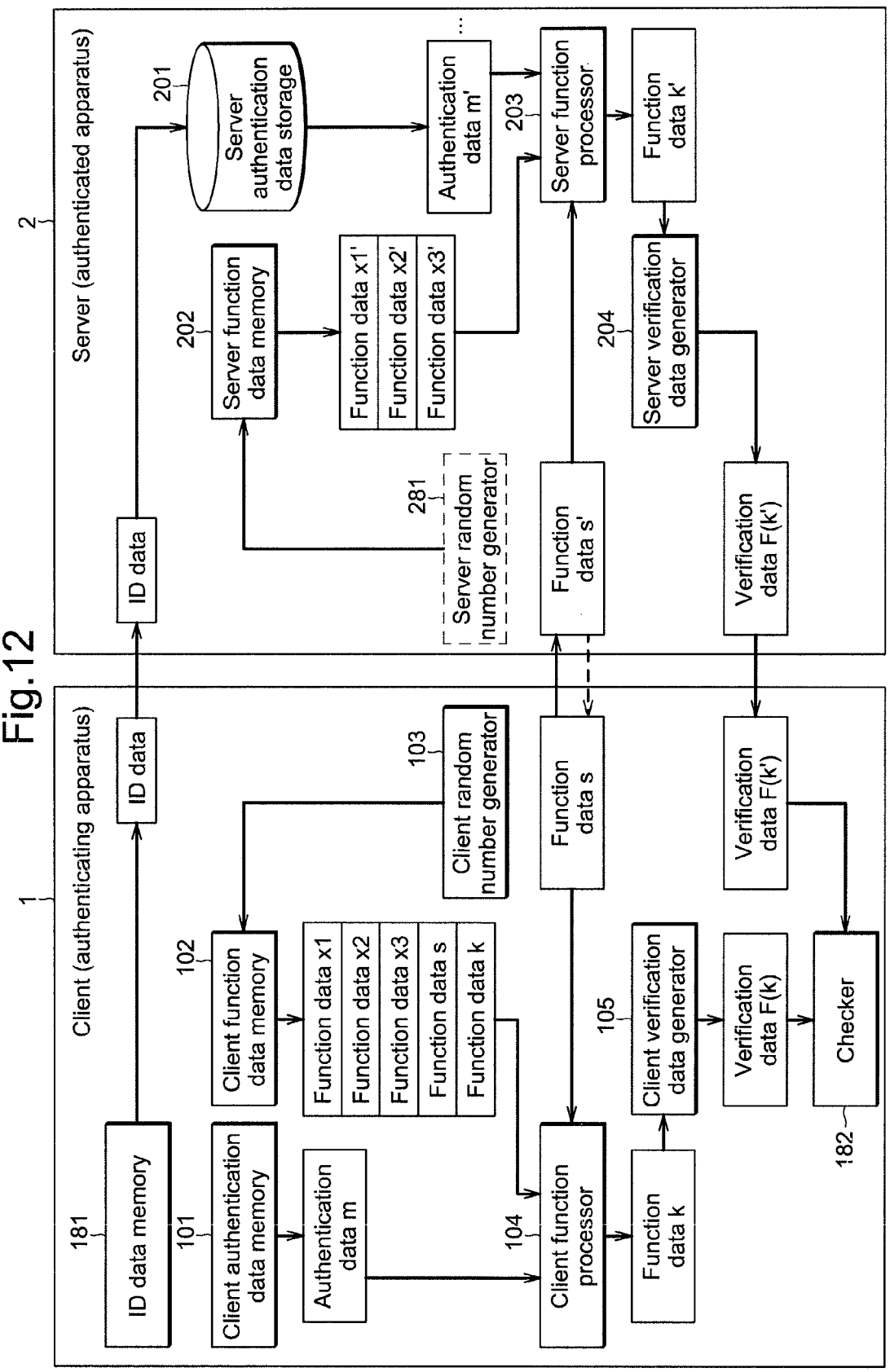
FIG. 12 illustrates an overview and a configuration of an eighth embodiment of the present invention.

FIG. 12 is a block diagram illustrating an eighth embodiment of the client and server shown in FIG. 1. Contrary to the preceding examples, client 1 verifies authenticity of server 2 in the present embodiment, where client 1 serves as an authenticating apparatus, and server 2 serves as an authenticated apparatus.

In addition to the configuration explained in the example of FIG. 5, client (authenticating apparatus) 1 has ID data memory 181, which stores ID data identifying authentication data m of the authenticating apparatus. The ID data retrieved from ID data memory 181 and function data s generated by client random number generator 103 are transmitted to server 2. In FIG. 5, client 1 transmits verification data F (k) generated by client verification data generator 105; and server 2 has checker 205, which compares and verifies verification data F (k) transmitted from client 1 against verification data F (k)' self-generated by server verification data generator 204. In contrast, server (authenticated apparatus) 2 in FIG. 12 retrieves from server authentication data storage 201, authentication data m associated with the ID data received from client 1; and transmits to client 1, verification data F (k)' obtained from server verification data generator 204. Client 1 has checker 182, which compares verification data F (k)' received from server 2 against verification data F (k) obtained from client verification data generator 105, and then verifies authenticity of server 2.

Further, server 2 may have server random number generator 281, which generates function data s' using a random number, and transmit obtained function data s' to client 1. In the configuration, the client can confirm whether or not the server is proper before receiving authentication.

The examples shown in the figures above may be combined to configure the system. In the respective examples in FIG. 5 and the figures thereafter, the linear function shown in FIG. 3A is employed. The quadratic function shown in FIG. 4, however, may also be employed. Alternatively, other functions, including a cubic function and the like, may also be employed.

It is explained in the examples shown in the figures above that client 1 stores authentication data m in authentication data memory 101. Unless a card containing authentication data is authenticated, however, a user may enter authentication data from a keyboard for each authentication.

Ninth Embodiment

Figure 13:
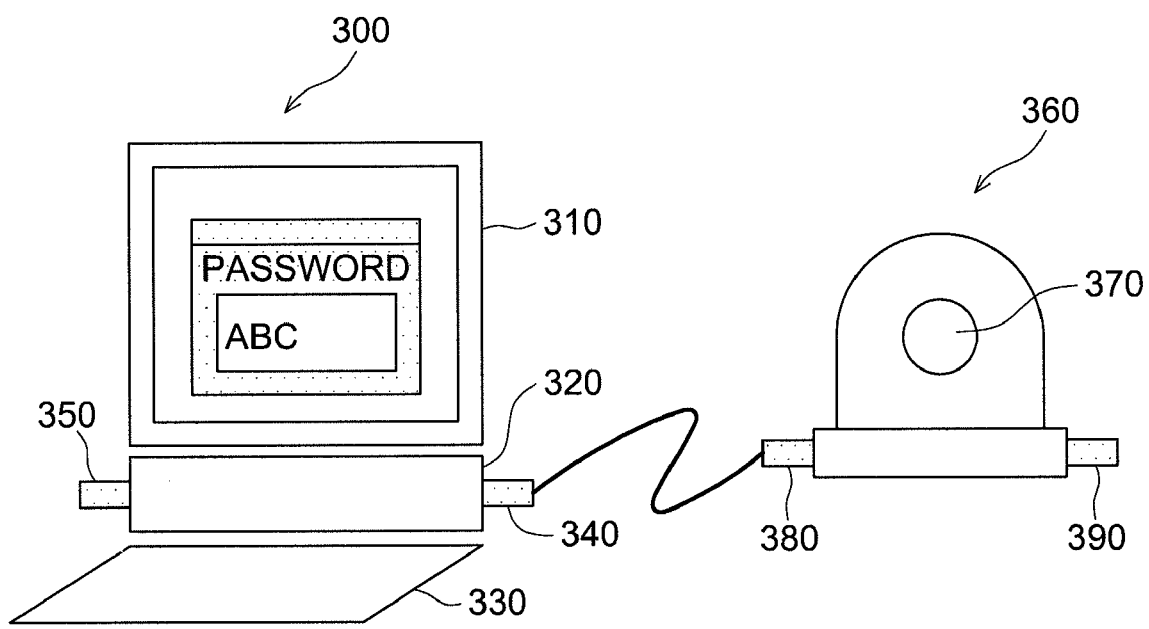
FIG. 13 illustrates a configuration of a monitor system according to a ninth embodiment of the present invention.
Figure 14:
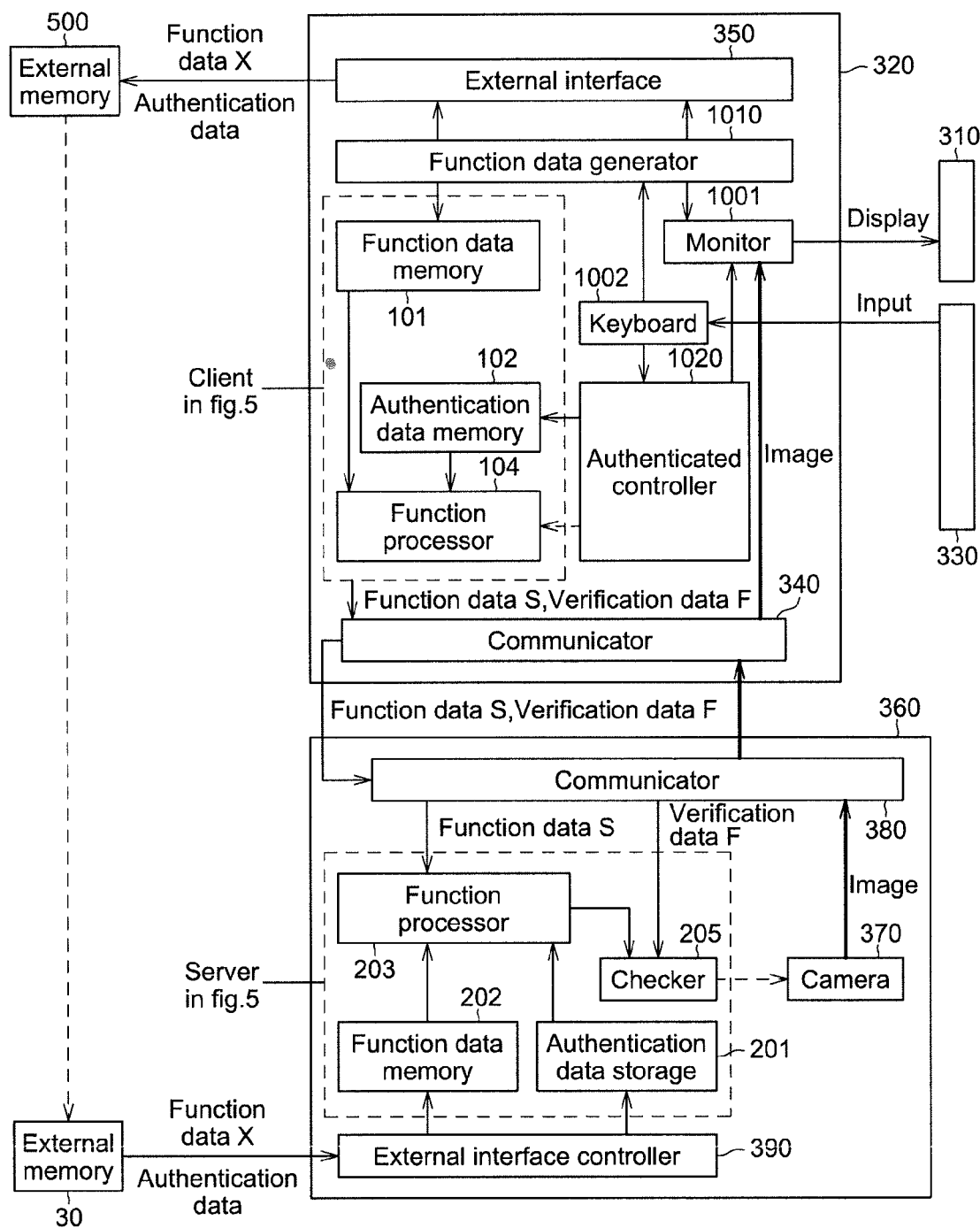
FIG. 14 is a block diagram of the monitor system according to the ninth embodiment of the present invention.

An embodiment is explained below in which a secret authentication apparatus according to the present invention is installed in a device. FIG. 13 illustrates a configuration of a monitor system according to a ninth embodiment of the present invention. In FIG. 13, PC 300, which serves as an authenticated apparatus, includes monitor 310, PC main body 320, keyboard 330, PC communicator 340, and external interface 350. Monitor 310 displays a password input screen of an authenticated program. PC main body 320 includes a CPU that operates the authenticated program, and a memory. Keyboard 330 allows a user to enter a password. PC communicator 340 performs network communication. External interface 350, which is a USB interface and the like, transmits and receives data with an external memory. Further, IP camera 360 for monitoring includes camera 370; IP camera communicator 380 that performs network communication, similar to PC communicator 340; and external interface 390. Network cable 400 is shown in the figure, but is unnecessary for wireless communication. FIG. 14 is a block diagram of the monitor system shown in FIG. 13. Similar to FIG. 13, FIG. 14 shows monitor 310 that displays the password input screen of the authenticated program; PC main body 320 that includes the CPU that operates the authenticated program, and the memory; keyboard 330 that allows a user to enter a password; PC communicator 340 that performs network communication; and external interface 350, which is a USB interface and the like, that transmits and receives data with an external memory. Similar to FIG. 13, FIG. 14 further shows IP camera 360 for monitoring; camera 370; IP camera communicator 380 that performs network communication; external interface 390; and network cable 400. First, distributed data generator 1010 is started up. Then, distributed data generator 1010 displays on monitor 1001 a screen prompting a user to enter authentication data m to be used. When the user enters authentication data m from keyboard 330, distributed data generator 1010 generates a random number and stores in client function data memory 101 the random number as function data X associated with the authentication data. Concurrently, the authentication data and function data X are stored in external memory 500 through external interface 350. Subsequently, the user inserts external memory 500 into external interface 390 of IP camera 360. External interface 390 stores authentication data m' in server authentication data storage 201 and function data X' in server function data memory 202, such that authentication data m' and function data X' are associated. After the operations above are completed, authenticated controller 1020 is started up. Authenticated controller 1020 displays on monitor 1001 a screen prompting the user to enter authentication data. When the user enters authentication data m from keyboard 330, authenticated controller 1020 stores authentication data m in client authentication data memory 102, and instructs client function processor 104 to perform a series of authentication operations. Client function processor 104 reads out authentication data m from client authentication data memory 102, and retrieves function data X associated with authentication data m from client function data memory 101. As shown in FIG. 5, PC 320 then transmits function data S and verification data F to IP camera 360 through PC communicator 340. When IP camera 360 receives function data S and verification data F through IP camera communicator 380, IP camera 360 performs authentication at checker 205, as shown in FIG. 5, by using function data X and authentication data m', which are associated and stored in server function data memory 202 and server authentication data storage 201, respectively. When the authentication is successful, checker 205 activates camera 370. Then, camera 370 transmits recorded image data to PC 320 through IP camera communicator 380. PC 320 receives the image data through PC communicator 340, transfers the image data to monitor 1001, and then displays the data on monitor 310.

The secret authentication system according to the present invention has effects in ensuring high secrecy and reducing calculation load for cost reduction. The secret authentication system is effective as a secret authentication system in which an authenticated apparatus notifies an authenticating apparatus of authentication data so that authentication is performed while others are kept from the data.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A secret authentication system comprising:
a client; and
a server performing authentication of the client, wherein the client comprises:
   a client authentication data memory storing one of an x coordinate and a y coordinate of a specific point on a function, as client authentication data indicating the client's authenticity;
   a function data generator generating client rule data and client function data, the client rule data being a coordinate not defined as the client authentication data on one of the x coordinate and the y coordinate of the specific point on the function, the client function data being x coordinates and y coordinates of a plurality of points excluding the specific point on the function;
   a random number generator generating any of the client function data using a random number, and transmitting the random number to the server;
   a client function data memory storing, as client function data, the client function data generated by the function data generator and the random number generated by the random data generator, wherein the random number defines a point on the function other than the specific point;
   a client function processor specifying the function by using the client authentication data stored in the client authentication data memory, the client function data stored in the client function data memory, and the random number generated by the random number generator; and
   a client verification data generator converting, by using a one-way function, a portion or all of the client function data output from the client function processor into client verification data, and transmitting the client verification data to the server; and wherein
the server comprises:
   a server authentication data storage obtaining the client authentication data stored in the client authentication data memory, and storing the client authentication data as server authentication data;
   a server function data generator generating server rule data and server function data, the server rule data being identical to the client rule data generated by the function data generator of the client, the server function data being identical to the client function data generated by the function data generator of the client;
   a server function data memory storing, as server function data, the random number obtained from the random number generator of the client, and the rule data and the function data generated by the function data generator of the client;
   a server function processor specifying a function identical to the function specified by the client function processor of the client, by using the server authentication data stored in the server authentication data storage and the server function data stored in the server function data memory;
   a server verification data generator converting one of a portion and all of the server function data output from the server function processor into server verification data, by using a one-way function identical to the one-way function used by the client verification data generator of the client; and
   a checker checking the client verification data obtained from the client verification data generator and the server verification data output from the server verification data generator.

2. The secret authentication apparatus according to claim 1, wherein the function that the client and the server use for authentication is a linear function.

3. The secret authentication apparatus according to claim 1, wherein the function that the client and the server use for authentication is a polynomial function having a degree of at least two.

4. The secret authentication apparatus according to claim 1, wherein the client function data includes the client authentication data and the client rule data.

5. A method of authenticating a client apparatus by a server apparatus via a network, the method comprising:
storing authentication data in a client authentication data memory of the client apparatus and in a server authentication data storage of the server apparatus;
storing rule data and function data in a client function data memory of the client apparatus and in a server function data memory of the server apparatus;
generating, by the client apparatus, a random number;
specifying, by the client apparatus, a function based on the authentication data stored in the client authentication data memory, the rule data and function data stored in the client function data memory, and the random number, wherein the random number defines a point on the function;
determining, by the client apparatus, one function data from the function data stored in the client function data memory based on the specified function;
converting, by the client apparatus, the one function data into client verification data by using a one-way function;

transmitting the random number and the client verification data from the client apparatus to the server apparatus via the network;

generating, by the server apparatus, server verification data based on the authenticated data stored in the server authentication data storage, the rule data and function data stored in the server function data memory, and the random number transmitted from the client apparatus, using the one-way function used by the client apparatus;

determining, by the server apparatus, whether the client verification data transmitted from the client apparatus corresponds to the server verification data generated by the server apparatus; and authenticating the client apparatus when it is determined that the client verification data corresponds to the server verification data.

6. The method as set forth in claim 5, wherein the function determined by the client function processor is a linear function.

7. The method as set forth in claim 5, wherein the function determined by the client function processor is a polynomial function having a degree of at least two.

8. The method as set forth in claim 5, wherein generating the server verification data comprises:

determining, by the server apparatus, a function based on the function data stored in the server function data memory and the random number transmitted from the client;

determining, by the server apparatus, the one function data from the function data stored in the server function data memory, based on the function determined by the server apparatus; and converting, by the server apparatus, the one function data determined by the server apparatus into the server verification data using the one-way function.

9. The method as set forth in claim 5, further comprising transmitting the predetermined authentication data from one of the client apparatus and the server apparatus to the other of the client apparatus and the server apparatus before storing the predetermined authentication data in the other of the client and the server.

10. The method as set forth in claim 9, wherein the authentication data is not transmitted from one of the client apparatus and the server apparatus to the other of the client apparatus and the server apparatus via the internet.

11. The method as set forth in claim 5, further comprising:

updating the rule data stored in the client function data memory and stored in the server function data memory; and updating the function data stored in the client function data memory and stored in the server function data memory.

12. A method of authenticating a client apparatus by a server apparatus via a network, the method comprising:

storing authentication data in a server authentication data storage of the server apparatus;

storing rule data and function data in a server function data memory of the server apparatus;

receiving a random number and client verification data from the client apparatus via the network;

determining, by the server apparatus, a function based on the authentication data stored in the server authentication data storage, the rule data and the function data stored in the server function data memory and the random number received from the client, wherein the random number defines a point on the function;

determining, by the server apparatus, one function data from the function data stored in the server function data memory, based on the function;

converting, by the server apparatus, the one function data into the server verification data, using a one-way function, which is identical to a one-way function used in the client apparatus to obtain the client verification data;

determining, by the server apparatus, whether the client verification data received from the client apparatus corresponds to the server verification data; and authenticating the client apparatus when it is determined that the client verification data corresponds to the server verification data.

13. The method as set forth in claim 12, wherein the function determined by the server apparatus is a linear function.

14. The method as set forth in claim 12, wherein the function determined by the server apparatus is a polynomial function having a degree of at least two.

15. The method as set forth in claim 12, wherein the authentication data, the rule data, and the function data are stored in the client apparatus.

16. The method as set forth in claim 15, further comprising updating the authentication data, the rule data, and the function data stored in the server apparatus and the client apparatus.

17. A client apparatus that is authenticated by a server apparatus, comprising:

a client authentication data memory that stores client authentication data indicating authenticity of the client apparatus, the client authentication data comprising one of an x coordinate and a y coordinate of a specific point on a function;

a client function data memory that stores client function data and client rule data, the client rule data being another of the x coordinate and the y coordinate of the specific point on the function, the client function data being x coordinates and y coordinates of a plurality of points excluding the specific point on the function;

a random number generator configured to generate a random number, and transmit the generated random number to the server apparatus, wherein the random number defines a point on the function other than the specific point;

a client function processor configured to specify the function, based on the client authentication data stored in the client authentication data memory, the client function data and the client rule data stored in the client function data memory, and the random number generated by the random number generator, and determines one client function data from the client function data stored in the client function data memory based on the specified function;

a client verification data generator configured to convert the one client function data determined by the client function processor into a client verification data, using a one-way function, and to transmit the client verification data to the server apparatus.

18. The client apparatus according to claim 17, wherein the client function processor specifies the function based upon the random number, after the random number generator generates the random number defining the point on the function.

19. The client apparatus according to claim 17, wherein the one-way function is used after the client function processor specifies the function and determines one client function data, and the one-way function is not used when the client function processor specifies the function and determines one client function data.

20. A server apparatus that authenticates a client apparatus, comprising:
- a server authentication storage that stores server authentication data, which comprises one of an x coordinate and a y coordinate of a specific point on a function, and is identical to client authentication data obtained from the client apparatus;
- a server function data memory that stores server rule data and server function data, the server rule data being another of the x coordinate and the y coordinate of the specific point on the function, the server function data being x coordinates and y coordinates of a plurality of points excluding the specific point on the function, the server rule data and the server function data being respectively identical to the client rule data and the client function data stored in the client apparatus;
- a receiver that receives a random number and client verification data from the client apparatus, wherein the random number defines a point on the function other than the specific point;
- a server function processor configured to specify the function based on the server authentication data stored in the server authentication storage, the server rule data and the server function data stored in the server function data memory, and the random number received by the receiver, and determines one server function data from the server function data stored in the server function data memory, based on the specified function;
- a server verification data generator configured to convert the one server function data determined by the server function processor, into server verification data, by using a one-way function identical to the one-way function used by the client apparatus; and
- a checker configured to determine whether the client verification data received by the receiver corresponds to the server verification data.

* * * * *